(12) United States Patent
Chan

(10) Patent No.: US 9,729,343 B2
(45) Date of Patent: Aug. 8, 2017

(54) UPSTREAM DEVICE OVERVOLTAGE DETECTION WITH DEACTIVATION OF DOWNSTREAM DEVICE POWER

(75) Inventor: Kok Hong Chan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/346,833

(22) Filed: Dec. 30, 2008

(65) Prior Publication Data
US 2010/0165528 A1 Jul. 1, 2010

(51) Int. Cl.
*H02H 3/00* (2006.01)
*H04L 12/40* (2006.01)

(52) U.S. Cl.
CPC .............................. *H04L 12/40045* (2013.01)

(58) Field of Classification Search
CPC ........................................................ H02H 3/20
USPC ............................................................ 361/86
See application file for complete search history.

(56) References Cited

U.S. PATENT DOCUMENTS

| | | | | |
|---|---|---|---|---|
| 4,270,179 | A * | 5/1981 | Sifford et al. | 708/422 |
| 4,347,602 | A | 8/1982 | Kister et al. | |
| 4,406,007 | A | 9/1983 | Kister et al. | |
| 6,946,904 | B1 * | 9/2005 | Varma et al. | 327/595 |
| 7,161,393 | B1 * | 1/2007 | Potanin et al. | 327/108 |
| 2002/0032876 | A1 * | 3/2002 | Okagaki et al. | 713/300 |
| 2004/0205279 | A1 * | 10/2004 | Ohnishi | 710/305 |
| 2005/0052156 | A1 * | 3/2005 | Liebenow | G06F 1/1632 320/128 |
| 2007/0124518 | A1 * | 5/2007 | Fujiwara | 710/71 |
| 2008/0068770 | A1 | 3/2008 | Kiuchi | |
| 2008/0158757 | A1 * | 7/2008 | G.K. et al. | 361/91.5 |
| 2008/0165460 | A1 * | 7/2008 | Whitby-Strevens | 361/86 |
| 2009/0009138 | A1 * | 1/2009 | Ahmad et al. | 320/137 |
| 2009/0045677 | A1 * | 2/2009 | Frey | H03K 17/28 307/38 |
| 2009/0109587 | A1 * | 4/2009 | Smith et al. | 361/86 |
| 2009/0296723 | A1 * | 12/2009 | Chang et al. | 370/401 |

(Continued)

FOREIGN PATENT DOCUMENTS

| | | |
|---|---|---|
| DE | 28 23 708 | 12/1979 |
| JP | 11252906 | 9/1999 |
| JP | 11327665 | 11/1999 |
| JP | 2001352674 | 12/2001 |
| JP | 2003216287 | 7/2003 |
| JP | 2003263373 | 9/2003 |
| JP | 2005085151 | 9/2003 |
| JP | 2005085151 | 3/2005 |
| JP | 2006171860 | 6/2006 |

(Continued)

OTHER PUBLICATIONS

First Office Action mailed Mar. 17, 2011 for Korean Patent Application No. 10-2009-0130568.

(Continued)

*Primary Examiner* — Ronald W Leja
(74) *Attorney, Agent, or Firm* — Blakely, Sokoloff, Taylor & Zafman LLP

(57) ABSTRACT

For one disclosed embodiment, a controller comprises communication circuitry to communicate over one or more data lines with a downstream device external to an upstream device having the controller and detection circuitry to detect on at least one of the one or more data lines a voltage having a value in excess of a reference value. The detection circuitry is to deactivate a supply of power over one or more power lines to the downstream device in response to detection on at least one of the one or more data lines of a voltage having a value in excess of the reference value. Other embodiments are also disclosed.

18 Claims, 6 Drawing Sheets

(56) References Cited

U.S. PATENT DOCUMENTS

2010/0165528 A1* 7/2010 Chan ............... H04L 12/40045
                                                                    361/86

FOREIGN PATENT DOCUMENTS

| JP | 2007189844 | | 7/2007 |
|---|---|---|---|
| JP | 2008009898 A | * | 1/2008 |
| KR | 1020010038280 | | 5/2001 |

OTHER PUBLICATIONS

Notice of Allowance mailed Mar. 27, 2012 for Korean Patent Application No. 10-2009-0130568.
Notice of Reasons for Rejection mailed Oct. 4, 2011 for Japanese Patent Application No. 2009-289743.
Final Notice of Reasons for Rejection mailed Sep. 11, 2012 for Japanese Application No. 2009-289743.
Office Action issued for German Patent Application No. 10 2009 058 425.0-31, mailed Feb. 27, 2013, 13 pages.
Decision of Rejection and Decision to Dismiss the Amendment issued in Japanese Patent Application No. 2009-289743, mailed Mar. 12, 2013, 6 pages.
The English translation of JP Patent Application Publication No. 2008 009898 cited by Examiner in the Office Action mailed Jun. 25, 2010. This translation was provided to applicant by a professional translator service located at 1304 False Creek Way, Chesapeake, VA 23322 (http://www.patenttranslators.com/) on Jun. 11, 2015, 15 pages.

* cited by examiner

UPSTREAM DEVICE OVERVOLTAGE DETECTION WITH DEACTIVATION OF DOWNSTREAM DEVICE POWER

FIELD

Embodiments described herein generally relate to communication between devices.

BACKGROUND

FIG. 1 illustrates a prior art diagram of a Universal Serial Bus (USB) Specification Revision 2.0 (Apr. 27, 2000) (hereinafter USB2) system 100. System 100 has a host device 120 and a bus-powered device 150 connected to host device 120 by a USB2 cable 110. Host device 120 has a system board 122 and has on system board 122 an integrated circuit 124 having a USB2 host controller 130. USB2 host controller 130 has a transceiver circuit 132 to transmit data signals to and receive data signals from device 150 over differential data signal lines D+ 111 and D− 112 of USB2 cable 110. Device 150 similarly has a transceiver circuit 152 to communicate with transceiver circuit 132 over data signal lines D+ 111 and D− 112. Transceiver circuits 132 and 152 communicate using data signals that vary in voltage between approximately 3.3 V and ground. Integrated circuit 124 may be part of an input/output (I/O) controller chipset.

Host device 120 also has on system board 122 a voltage regulator module (VRM) 126 to provide an approximately 5 Volt (V) supply signal over a power line VBUS 115 of USB2 cable 110 to power device 150. Device 150 has a voltage regulator 154 to receive the 5V supply signal and provide regulated voltage supply to transceiver 152.

FIG. 2 illustrates a prior art diagram of a segment of USB2 cable 110. As illustrated in FIG. 2, USB2 cable 110 has differential data signal lines D+ 111 and D− 112, power line VBUS 115, and a ground line GND 118 that run adjacent to one another.

In the event of a short circuit of data signal line D+ 111 and/or D− 112 to power line VBUS 115, for example due to any crushing or cutting of a portion of USB2 cable 110, transceiver circuit 132, for example, would receive a 5V signal which is higher than the 3.3V data signal transceiver circuit 132 is designed to receive. Such a short circuit may therefore be potentially damaging to transceiver circuit 132. The Universal Serial Bus (USB) Specification Revision 2.0 (Apr. 27, 2000) (hereinafter USB2) states that a USB2 transceiver is required to withstand a continuous short circuit of data lines D+ and/or D− to the power bus VBUS for a minimum of twenty-four hours without degradation.

One mechanism to provide 5V protection in 3.3 V semiconductor fabrication technology is to stack transistors to avoid electrical overstress (EOS) damage if a 5V signal appears on data line D+ 111 and/or D− 112.

FIG. 3 illustrates a prior art diagram of circuitry for transceiver circuit 132 to protect transceiver circuit 132 from a 5V overvoltage condition on data line D+ 111 and/or D− 112. As illustrated in FIG. 3, transceiver circuit 132 includes a transmitter 310, a receiver 320, an overvoltage detector 330, and a programmable controller 340. Transmitter 310, receiver 320, and overvoltage detector 330 include circuitry as shown.

Transmitter 310 includes transistors to implement a high speed current source transmitter 312 and a complementary metal oxide semiconductor (CMOS) transmitter 314 to transmit data signals over data signal line D+ 111. As illustrated in FIG. 3, CMOS transmitter 314 has stacked transistors to avoid EOS damage if a 5V signal appears on data line D+ 111. Overvoltage detector 330 includes a voltage divider 332 and a differential amplifier 334 to detect whether a voltage in excess of 5V appears on data line D+ 111. Voltage divider 332 scales the voltage on data signal line D+ 111, and a differential amplifier 334 compares the scaled voltage to a reference voltage at node 333 having a value corresponding to a similarly scaled 5V signal. Differential amplifier 334 generates an overvoltage signal at node 335 if the scaled voltage exceeds the reference voltage. Programmable controller 340 sets transistor gate voltages to approximately those values shown in FIG. 3 in response to overvoltage signal at node 335 to avoid EOS damage.

This mechanism passively withstands the 5V signal on data line D+ 111. If the overvoltage is due to a short circuit of data signal line D+ 111 to power line VBUS 115 due to damage to USB2 cable 110, for example, the reliability of transceiver circuit 132 may nevertheless be at risk if the overvoltage condition is not addressed for a long period of time. Also, the feasibility of this mechanism is based at least in part on the voltage tolerance of the semiconductor fabrication technology. As semiconductor fabrication technology continues to scale, a transistor will be less able to withstand a higher voltage across its gate and diffusion. This mechanism will then not be able to meet the USB 2.0 Specification as the transistor will be more likely to degrade within twenty-four hours.

BRIEF DESCRIPTION OF THE DRAWINGS

Embodiments are illustrated by way of example and not limitation in the figures of the accompanying drawings, in which like references indicate similar elements and in which.

The figures of the drawings are not necessarily drawn to scale.

DETAILED DESCRIPTION

The following detailed description sets forth example embodiments of apparatuses, methods, and systems relating to upstream device overvoltage detection with deactivation of downstream device power. Features, such as structure(s), function(s), and/or characteristic(s) for example, are described with reference to one embodiment as a matter of convenience; various embodiments may be implemented with any suitable one or more described features.

Figure 1:
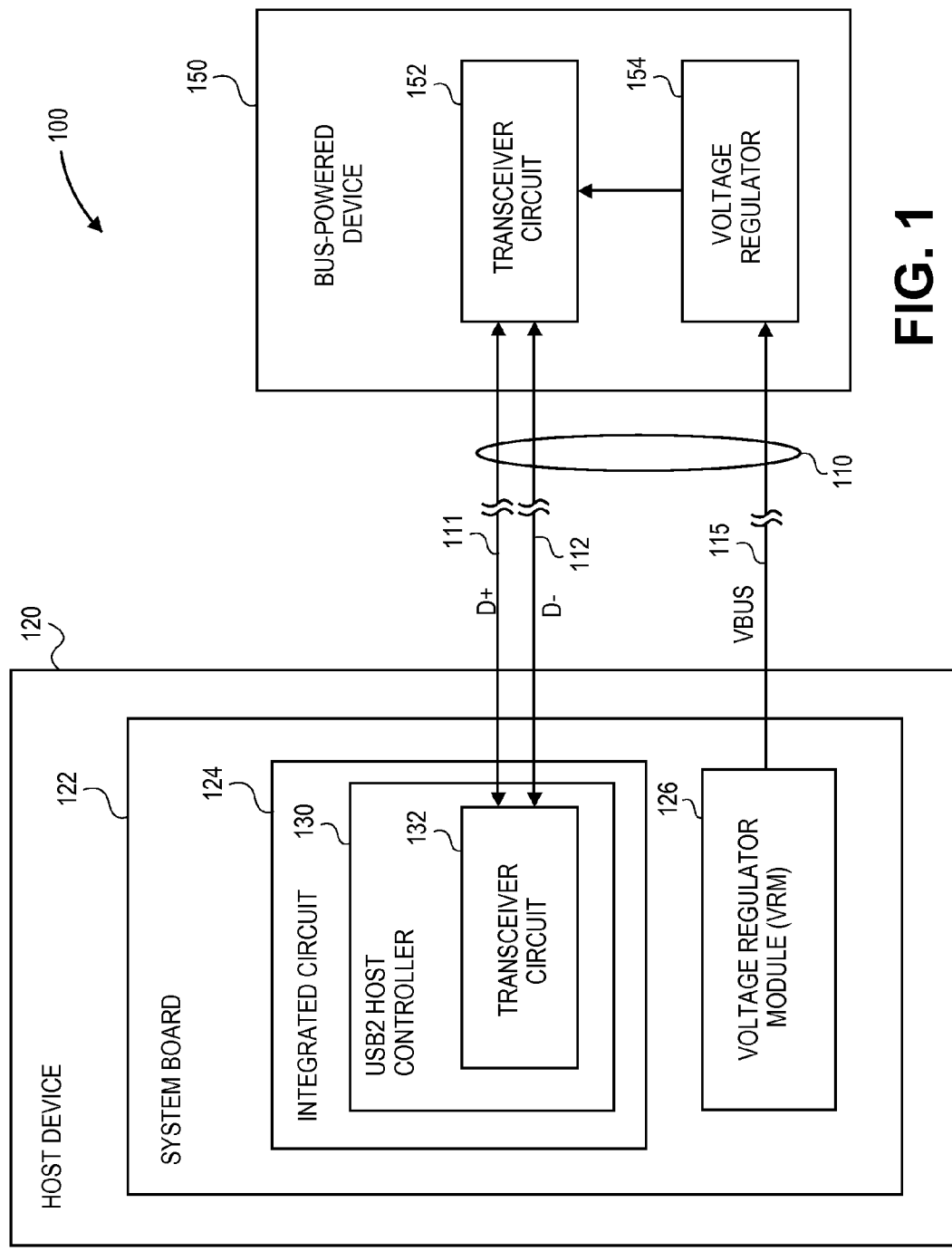
FIG. 1 illustrates a prior art diagram of a Universal Serial Bus (USB) Specification Revision 2.0 (Apr. 27, 2000) (hereinafter USB2) system.
Figure 2:
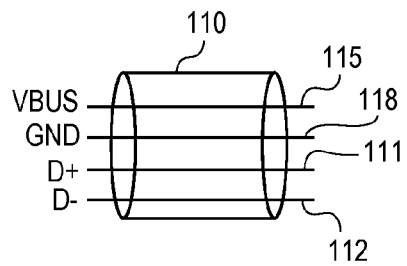
FIG. 2 illustrates a prior art diagram of a USB2 cable segment.
Figure 3:
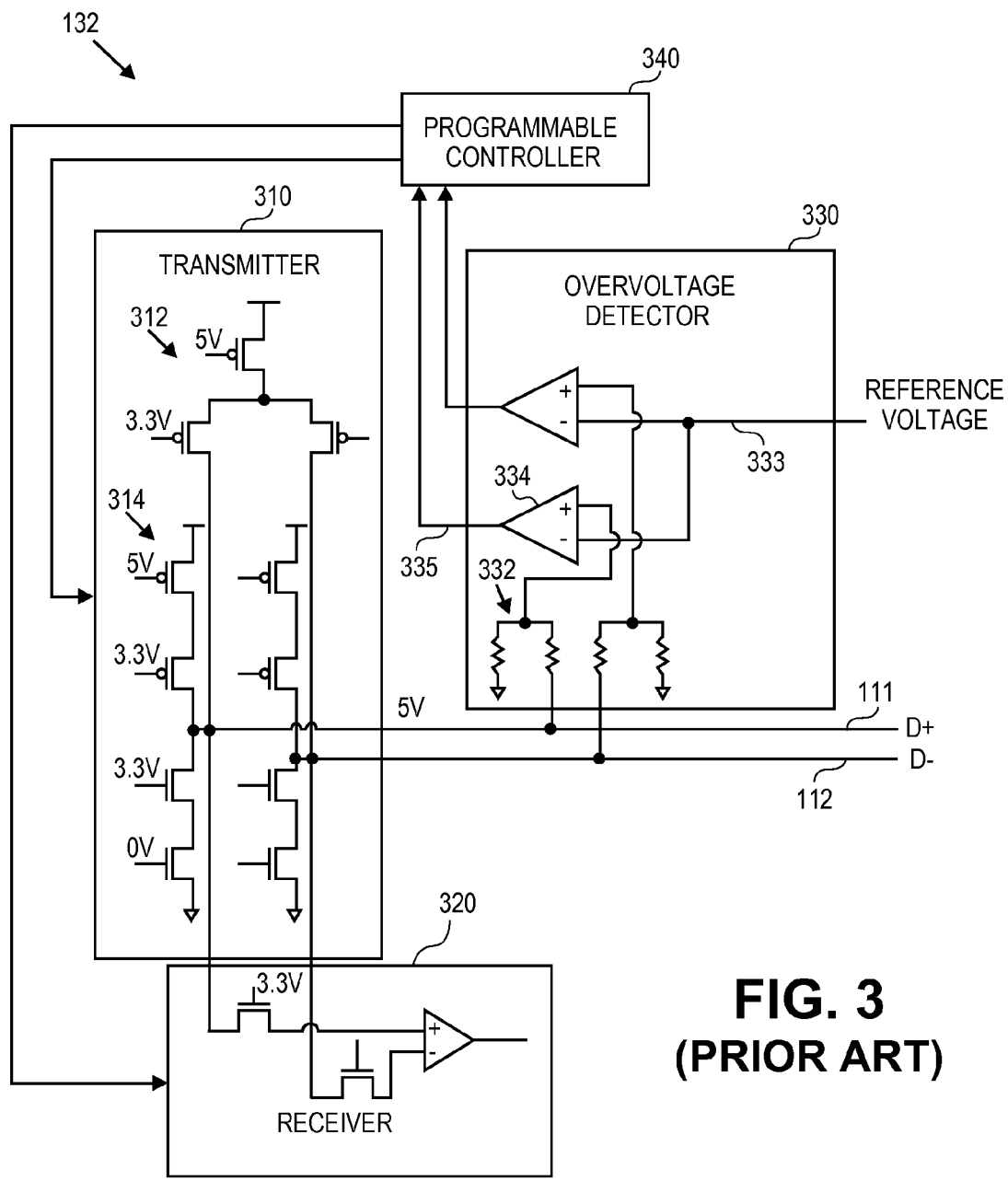
FIG. 3 illustrates a prior art diagram of circuitry for a transceiver circuit of a USB2 host controller to protect the transceiver circuit from an overvoltage condition on a USB2 cable data line.
Figure 4:
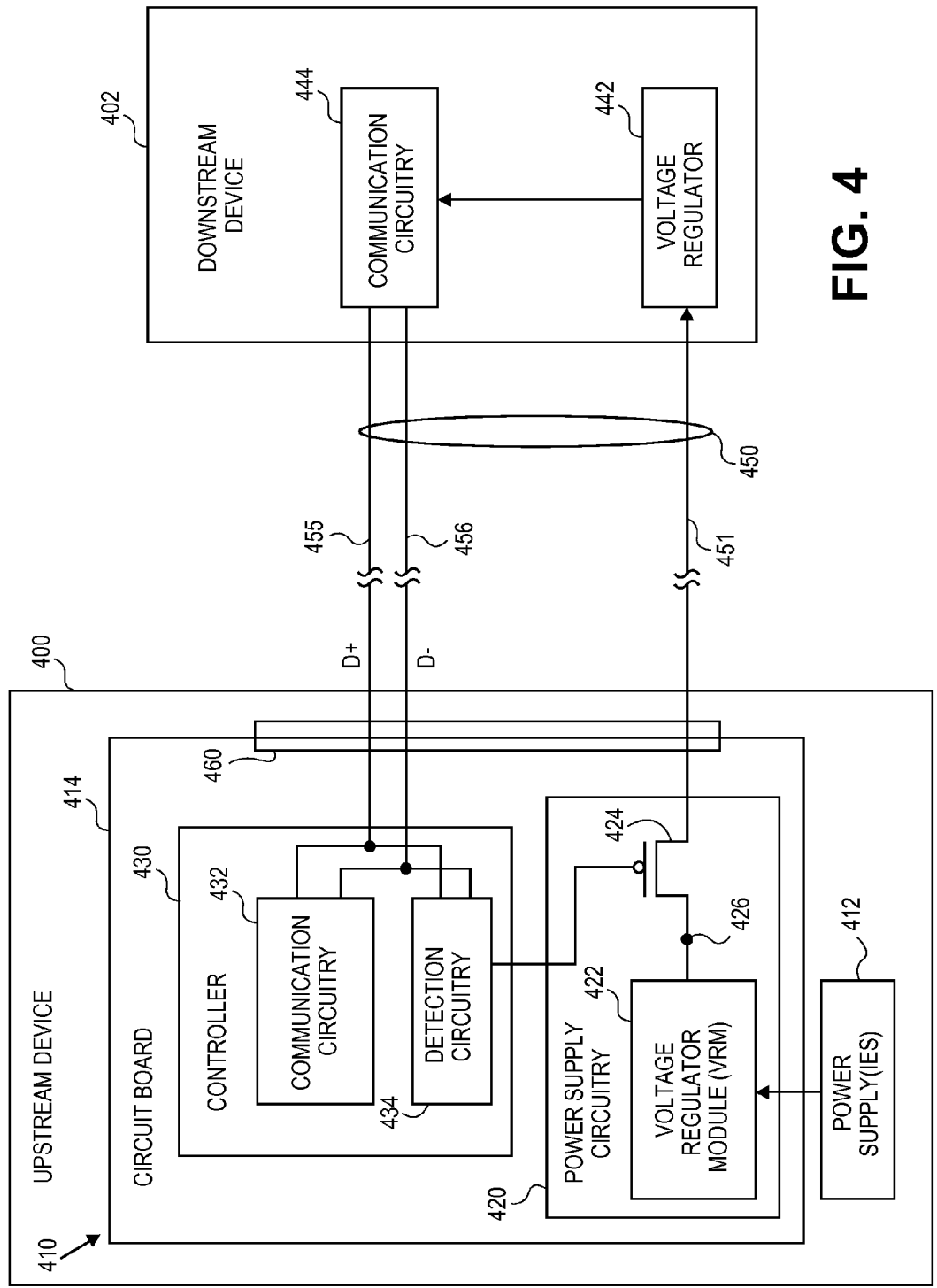
FIG. 4 illustrates, for one embodiment, a block diagram of a system for an upstream device to detect an overvoltage condition and deactivate a supply of power to a downstream device.

FIG. 4 illustrates, for one embodiment, an upstream device 400 comprising a system 410 coupled to supply power to at least a portion of a downstream device 402 external to upstream device 400 and coupled to communicate with downstream device 402. Upstream device 400 for one embodiment may be a host computing device. Upstream device 400 for one embodiment may be a hub device downstream from a host computing device.

System 410 for one embodiment may detect an overvoltage condition on one or more lines coupled to downstream device 402 and deactivate the supply of power to downstream device 402. System 410 for one embodiment may therefore remove the source of power for an overvoltage condition and thus remove the overvoltage condition. Having system 410 remove the source of power for one embodiment may help allow system 410 to be designed with reduced concern for having to passively withstand an overvoltage condition for a period of time without degradation. Having system 410 remove the source of power for one embodiment may help allow system 410 to be made using semiconductor fabrication technology having less voltage tolerance.

System 410 for one embodiment, as illustrated in FIG. 4, comprises one or more power supplies 412, power supply circuitry 420, and a controller 430.

Power supply circuitry 420 may supply power over one or more power lines, such as a power line 451 as illustrated in FIG. 4 for example, to downstream device 402. Power supply circuitry 420 for one embodiment may be coupled to receive power from one or more of power supply(ies) 412.

Power supply(ies) 412 may be implemented in any suitable manner. Power supply(ies) 412 for one embodiment may include one or more suitable energy cells, such as a battery or fuel cell for example. Power supply(ies) 412 for one embodiment may include an alternating current to direct current (AC-DC) converter. Power supply(ies) 412 for one embodiment may include a DC-DC converter. Power supply(ies) 412 for one embodiment may optionally include one or more voltage regulators to regulate supply of power to power supply circuitry 420, for example.

Power supply circuitry 420 may include any suitable circuitry coupled to supply power over one or more power lines to downstream device 402 in any suitable manner. Power supply circuitry 420 for one embodiment, as illustrated in FIG. 4, may include a voltage regulator module (VRM) 422 and may be coupled to receive one or more voltage signals from one or more of power supply(ies) 412 and supply one or more regulated voltage signals to power downstream device 402.

Downstream device 402 for one embodiment may comprise any suitable power supply circuitry, such as a voltage regulator 442 as illustrated in FIG. 4 for example, coupled to receive power supplied over one or more power lines and to power at least a portion of downstream device 402.

Controller 430 for one embodiment, as illustrated in FIG. 4, comprises communication circuitry 432 to communicate over one or more data lines with downstream device 402.

Communication circuitry 432 may include any suitable circuitry coupled to communicate over one or more data lines with downstream device 402 in any suitable manner. Communication circuitry 432 for one embodiment, as illustrated in FIG. 4, may include suitable circuitry to communicate with downstream device 402 using differential data signals over data lines D+ 455 and D− 456. Communication circuitry 432 for one embodiment may include any suitable transmitter circuitry to transmit signals over one or more data lines to downstream device 402. Communication circuitry 432 for one embodiment may include any suitable receiver circuitry to receive signals over one or more data lines from downstream device 402. Communication circuitry 432 may be coupled to transmit data signals from any suitable source logic of upstream device 400 and/or to receive data signals for any suitable destination logic of upstream device 400.

Downstream device 402 for one embodiment, as illustrated in FIG. 4, may comprise any suitable communication circuitry 444 to communicate over one or more data lines with communication circuitry 432 of upstream device 400.

Controller 430 for one embodiment, as illustrated in FIG. 4, comprises detection circuitry 434 to detect on at least one of the data line(s) a voltage having a value in excess of a reference value. Detection circuitry 434 is to deactivate a supply of power over one or more power lines to downstream device 402 in response to detection on at least one of the data line(s) of a voltage having a value in excess of the reference value. Detection circuitry 434 for one embodiment may therefore help remove an overvoltage condition on a data line by helping to remove the source of power for the overvoltage condition.

Detection circuitry 434 may include any suitable circuitry coupled to detect a voltage having a value in excess of a reference value and coupled to deactivate the supply of power to downstream device 402 in any suitable manner. Detection circuitry 434 for one embodiment, as illustrated in FIG. 4, may be coupled to detect on data line D+ 455 and/or data line D− a voltage having a value in excess of a reference value. Detection circuitry 434 for one embodiment, as illustrated in FIG. 4, may be coupled to deactivate power supply circuitry 420 from supplying power to downstream device 402.

Power supply circuitry 420 for one embodiment may include any suitable circuitry to cease supplying power to downstream device 402 in any suitable manner. Power supply circuitry 420 for one embodiment may include one or more transistors to couple one or more power lines to a supply node of power supply circuitry 420 and to decouple one or more power lines from a supply node of power supply circuitry 420. Power supply circuitry 420 may include any suitable one or more transistors, such as one or more suitable positive channel field effect transistors (pFETs) and/or one or more suitable negative channel field effect transistors (nFETs).

Detection circuitry 434 for one embodiment may be coupled to deactivate one or more transistors of power supply circuitry 420 to decouple one or more power lines from a supply node of power supply circuitry 420. Detection circuitry 434 for one embodiment may generate one or more signals in response to detection on at least one of the data line(s) of a voltage having a value in excess of the reference value to deactivate one or more transistors of power supply circuitry 420.

Power supply circuitry 420 for one embodiment, as illustrated in FIG. 4, may include a positive channel transistor 424 to couple a supply node 426 of power supply circuitry 420 to and decouple supply node 426 from power line 451. Detection circuitry 434 for one embodiment may generate a signal in response to detection on at least one of the data line(s) of a voltage having a value in excess of the reference value to deactivate positive channel transistor 424.

Upstream device 400 for one embodiment, as illustrated in FIG. 4, may be coupled to downstream device 402 by a single cable 450 that houses one or more power lines and one or more data lines between upstream device 400 and downstream device 402. In the event any damage to cable 450, for example from crushing or cutting a portion of cable 450, creates a short circuit of a data line to a power line, detection circuitry 434 for one embodiment may detect an overvoltage condition due to the short circuit and deactivate the supply of power on that power line to remove the overvoltage condition.

Cable 450 for one embodiment may also house a reference line, such as a ground line for example, between upstream device 400 and downstream device 402. Cable 450 for one embodiment may be removably couplable to system 410 of upstream device 400. Cable 450 for one embodiment may be removably couplable to downstream device 402.

Controller 430 for one embodiment may be compatible with any suitable Universal Serial Bus (USB) specification, such as USB Specification Revision 2.0 (Apr. 27, 2000) or any more recent USB specification. Power supply circuitry 420 for one embodiment may supply power over one or more power lines in a manner compatible with any suitable Universal Serial Bus (USB) specification. Cable 450 for one embodiment may be compatible with any suitable Universal Serial Bus (USB) specification. As controller 430 for one embodiment may comprise detection circuitry 434 that can detect an overvoltage condition due to a short circuit of a data line to a power line and deactivate the supply of power on that power line to remove the overvoltage condition, controller 430 for one embodiment readily meets any USB specification to withstand such a short circuit for a minimum of twenty-four hours without degradation.

System 410 for one embodiment may comprise a circuit board 414 on which controller 430 may be supported. Controller 430 for one embodiment may be implemented on a single integrated circuit mounted on or to circuit board 414. Power supply circuitry 420 for one embodiment, as illustrated in FIG. 4, may also be supported by circuit board 414. Power supply circuitry 420 for another embodiment may be supported by another circuit board. Such another circuit board may be supported separately from or supported by circuit board 414. Power supply(ies) 412 for one embodiment may or may not be supported by circuit board 414. Circuit board 414 for one embodiment may be used as a system board for upstream device 400.

System 410 for one embodiment, as illustrated in FIG. 4, may comprise a connector 460 to couple downstream device 402 to circuit board 414 by cable 450. Connector 460 may be supported separately from or supported by circuit board 414. Connector 460 for one embodiment may be compatible with any suitable Universal Serial Bus (USB) specification.

Figure 5:
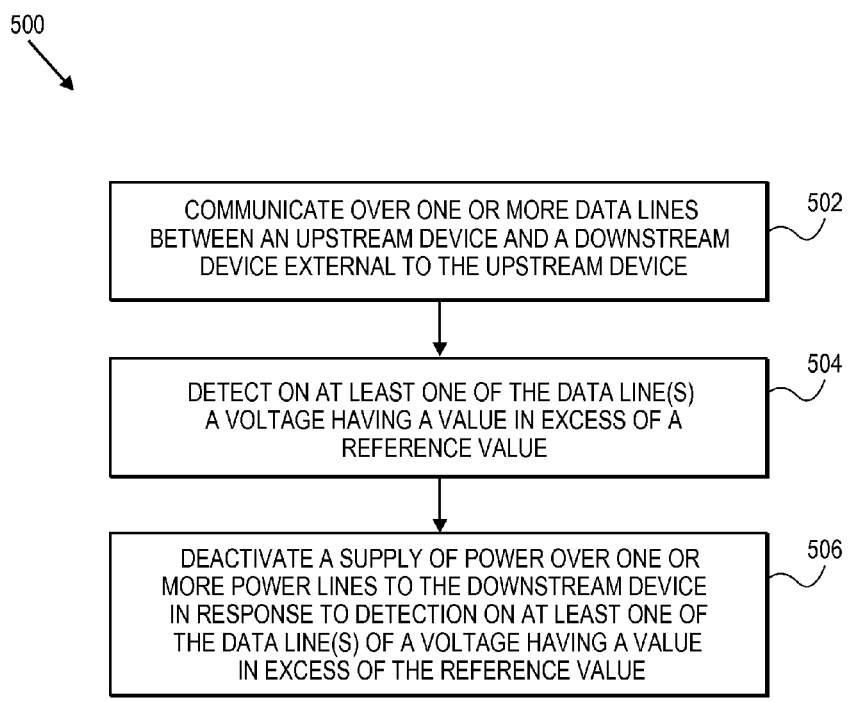
FIG. 5 illustrates, for one embodiment, a flow diagram for an upstream device to detect an overvoltage condition and deactivate a supply of power to a downstream device.

FIG. 5 illustrates, for one embodiment, a flow diagram 500 for upstream device 400 to detect an overvoltage condition and deactivate a supply of power to downstream device 402.

For block 502 of FIG. 5, upstream device 400 and downstream device 402 may communicate over one or more data lines between upstream device 400 and downstream device 402. Communicating with downstream device 402 for block 502 may be performed in a manner compatible with any suitable Universal Serial Bus (USB) specification.

For block 504, a voltage having a value in excess of a reference value may be detected on at least one of the data line(s). For block 506, a supply of power over one or more power lines to downstream device 402 may be deactivated in response to detection on at least one of the data line(s) of a voltage having a value in excess of the reference value.

Example Controller Circuitry

Figure 6:
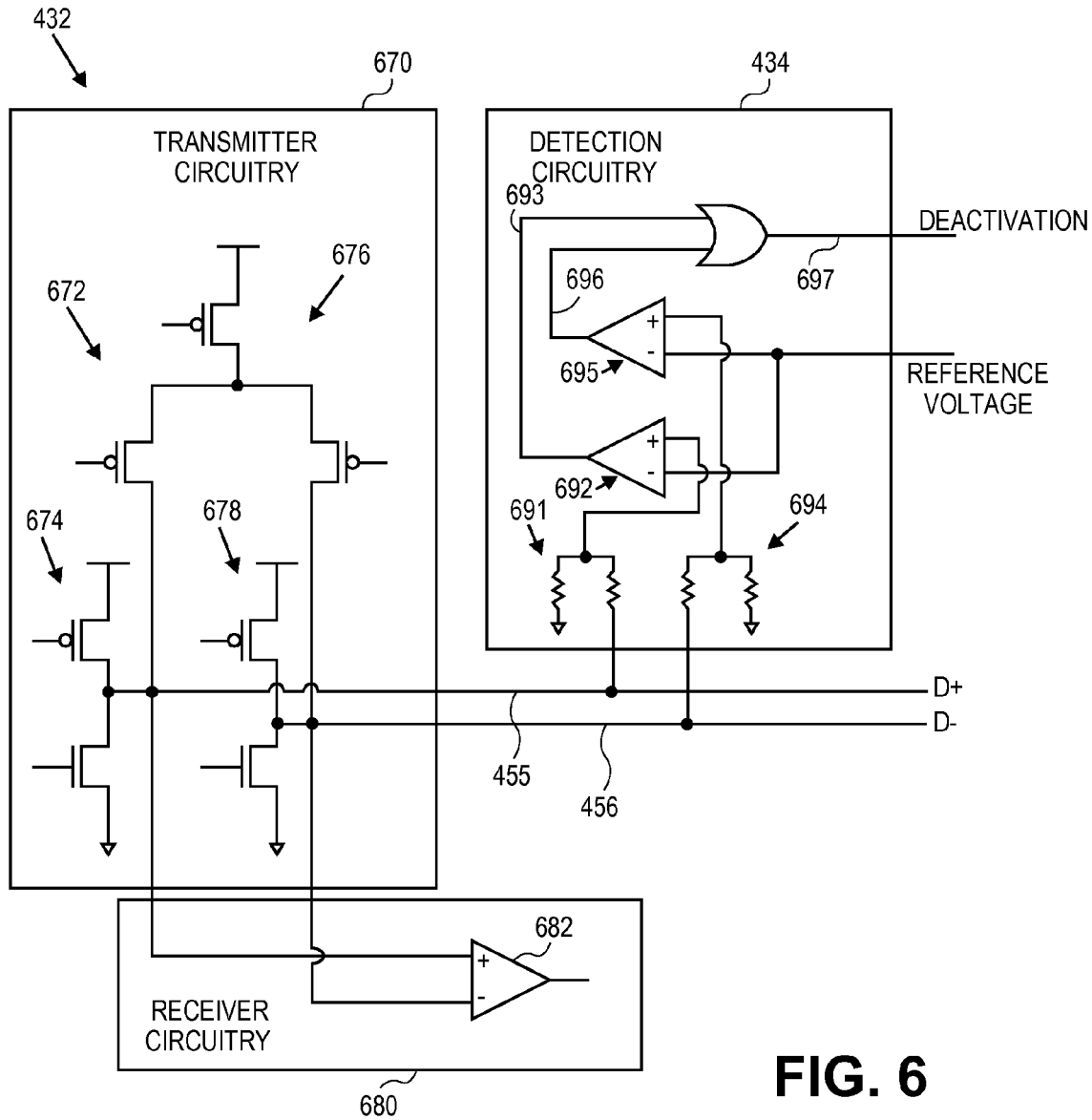
FIG. 6 illustrates, for one embodiment, example circuitry for an upstream device to detect an overvoltage condition and deactivate a supply of power to a downstream device.

FIG. 6 illustrates, for one embodiment, example circuitry for controller 430 to detect an overvoltage condition and deactivate a supply of power to downstream device 402.

As illustrated in FIG. 6, communication circuitry 432 for one embodiment may include transmitter circuitry 670 coupled to transmit differential data signals from upstream device 400 over data lines D+ 455 and D− 456 to downstream device 402.

Transmitter circuitry 670 for one embodiment, as illustrated in FIG. 6, may include suitable transistors coupled to implement a high speed current source transmitter 672 and a complementary metal oxide semiconductor (CMOS) transmitter 674 to transmit data signals over data signal line D+ 455. Transmitter circuitry 670 for one embodiment, as illustrated in FIG. 6, may include suitable transistors coupled to implement a high speed current source transmitter 676 and a complementary metal oxide semiconductor (CMOS) transmitter 678 to transmit data signals over data signal line D− 456.

Transmitter circuitry 670 for one embodiment may not comprise stacked transistors to passively withstand any overvoltage condition on data signal line D+ 455 and/or D− 456 but instead may use detection circuitry 434 to remove such an overvoltage condition.

Communication circuitry 432 for one embodiment, as illustrated in FIG. 6, may include receiver circuitry 680 coupled to receive differential data signals over data lines D+ 455 and D− 456 from downstream device 402. Receiver circuitry 680 for one embodiment, as illustrated in FIG. 6, may include a differential amplifier 682 coupled to sense data signals on data lines D+ 455 and D− 456.

Receiver circuitry 680 for one embodiment may not comprise transistors to passively withstand any overvoltage condition on data signal line D+ 455 and/or D− 456 but instead may use detection circuitry 434 to remove such an overvoltage condition.

Detection circuitry 434 for one embodiment, as illustrated in FIG. 6, may include a voltage divider 691 to divide a voltage on data line D+ 455 to produce another voltage and a comparator 692 to compare the other voltage to a reference voltage and to output a result of the comparison.

The reference voltage for one embodiment may correspond to a voltage level having a magnitude greater than that for data signals on data line D+ 455. The reference voltage for one embodiment may correspond to a reference value against which a value of voltage on data line D+ 455 may be considered excessive. Noting that the voltage on data line D+ 455 is scaled by voltage divider 691, the reference voltage for one embodiment may have a similarly scaled value relative to that reference value. Comparator 692 for one embodiment may output an overvoltage signal at node 693 if the scaled voltage from voltage divider 691 exceeds the reference voltage.

Voltage divider 691 may be implemented in any suitable manner using any suitable circuitry to implement resistors coupled to scale voltage on data line D+ 455. Comparator 692 may be implemented in any suitable manner, for example by using a differential amplifier coupled to compare the scaled voltage to a reference voltage. The reference voltage may be generated in any suitable manner from any suitable source.

Detection circuitry 434 for one embodiment, as illustrated in FIG. 6, may include a voltage divider 694 to divide a voltage on data line D− 456 to produce another voltage and a comparator 695 to compare the other voltage to a reference voltage and to output a result of the comparison.

The reference voltage for one embodiment may correspond to a voltage level having a magnitude greater than that for data signals on data line D− 456. The reference voltage for one embodiment may correspond to a reference value against which a value of voltage on data line D− 456 may be considered excessive. Noting that the voltage on data line D− 456 is scaled by voltage divider 694, the reference voltage for one embodiment may have a similarly scaled value relative to that reference value. Comparator 695 for one embodiment may output an overvoltage signal at node 696 if the scaled voltage from voltage divider 694 exceeds the reference voltage.

Voltage divider 694 may be implemented in any suitable manner using any suitable circuitry to implement resistors coupled to scale voltage on data line D− 456. Comparator 695 may be implemented in any suitable manner, for example by using a differential amplifier coupled to compare the scaled voltage to a reference voltage. The reference voltage may be generated in any suitable manner from any suitable source.

For one embodiment, voltage dividers 691 and 694 may scale voltage on data lines D+ 455 and D− 456 in a similar manner, and comparators 692 and 695 may compare scaled voltages from voltage dividers 691 and 694 to substantially the same reference voltage.

Detection circuitry 434 for one embodiment may not include voltage divider 691, and comparator 692 may be coupled to compare a voltage on data line D+ 455 to a suitable reference voltage corresponding to a reference value. Detection circuitry 434 for one embodiment may not include voltage divider 694, and comparator 695 may be coupled to compare a voltage on data line D− 456 to a suitable reference voltage corresponding to a reference value.

Detection circuitry 434 for one embodiment may include suitable circuitry to output a deactivation signal at node 697 in response to either overvoltage signal at node 693 or overvoltage signal at node 696. Detection circuitry 434 for one embodiment may include suitable circuitry to output deactivation signal at node 697 as the logical OR of overvoltage signals at nodes 693 and 696. Controller 430 for one embodiment may output deactivation signal at node 697 through General Purpose Input/Output (GPIO) to deactivate the supply of power to downstream device 402.

Detection circuitry 434 for another embodiment may separately output overvoltage signal at node 693 and overvoltage signal at node 696, and controller 430 for one embodiment may separately output overvoltage signal at node 693 and overvoltage signal at node 696 to deactivate the supply of power to downstream device 402. Controller 430 for one embodiment may separately output overvoltage signals at nodes 693 and 696 through General Purpose Input/Output (GPIO).

Example Upstream Device

Upstream device 400 may comprise any suitable components to function in any suitable manner. Upstream device 400 for one embodiment may comprise suitable components to form a computer system. Upstream device 400 may function, for example and without limitation, as a desktop computer system, an automobile computer system, or a portable computer system such as, for example, a notebook computer, a tablet computer, a netbook computer, or a mobile internet device (MID).

Figure 7:
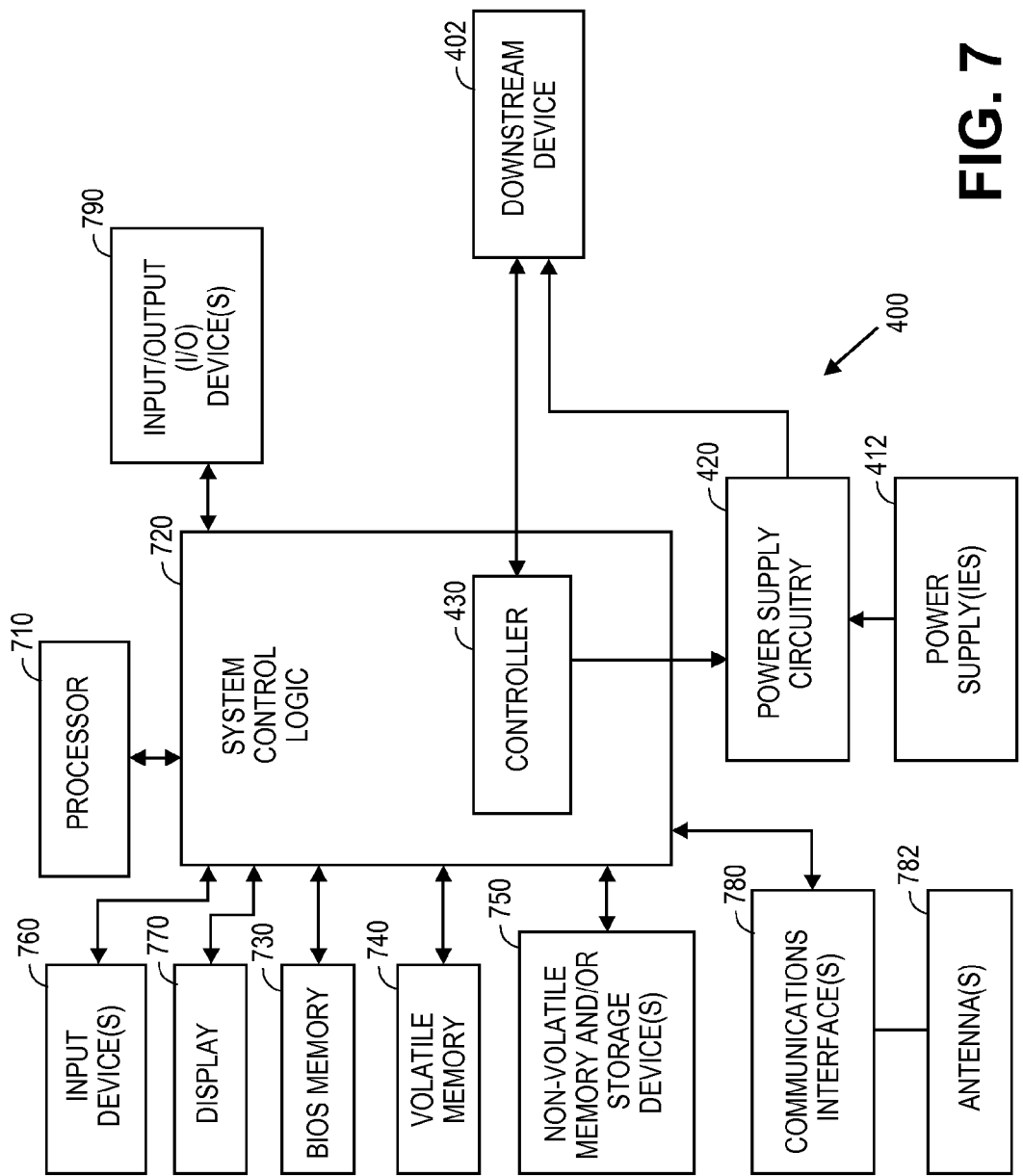
FIG. 7 illustrates, for one embodiment, a block diagram of example components for an upstream device adapted to detect an overvoltage condition and deactivate a supply of power to a downstream device.

FIG. 7 illustrates, for one embodiment, example components for upstream device 400. As illustrated in FIG. 7, upstream device 400 may comprise power supply(ies) 412, power supply circuitry 420, a processor 710, and system control logic 720 coupled to processor 710. System control logic 720 for one embodiment may include controller 430. Processor 710, logic of system control logic 720, and/or any other suitable component or logic of upstream device 400 may use controller 430 to communicate with downstream device 402.

Upstream device 400 may also have a basic input/output system (BIOS) memory 730 coupled to system control logic 720, volatile memory 740 coupled to system control logic 720, non-volatile memory and/or storage device(s) 750 coupled to system control logic 720, one or more input devices 760 coupled to system control logic 720, a display 770 coupled to system control logic 720, one or more communications interfaces 780 coupled to system control logic 720, and/or one or more other input/output (I/O) devices 790 coupled to system control logic 720.

System control logic 720 for one embodiment may include any suitable interface controllers, including controller 430, to provide for any suitable communications link to processor 710 and/or to any suitable device or component in communication with system control logic 720.

System control logic 720 for one embodiment may include a firmware controller to provide an interface to BIOS memory 730. BIOS memory 730 may be used to store any suitable system and/or video BIOS software for upstream device 400. BIOS memory 730 may include any suitable non-volatile memory, such as a suitable flash memory for example. BIOS memory 730 for one embodiment may alternatively be included in system control logic 720.

System control logic 720 for one embodiment may include one or more memory controllers to provide an interface to volatile memory 740. Volatile memory 740 may be used to load and store data and/or instructions, for example, for upstream device 400. Volatile memory 740 may include any suitable volatile memory, such as suitable dynamic random access memory (DRAM) for example.

System control logic 720 for one embodiment may include a graphics controller to provide an interface to display 770. Display 770 may include any suitable display, such as a cathode ray tube (CRT) or a liquid crystal display (LCD) for example. The graphics controller for one embodiment may alternatively be external to system control logic 720.

System control logic 720 for one embodiment may include one or more input/output (I/O) controllers to provide an interface to non-volatile memory and/or storage device(s) 750, input device(s) 760, communications interface(s) 780, and/or I/O devices 790.

Non-volatile memory and/or storage device(s) 750 may be used to store data and/or instructions, for example. Non-volatile memory and/or storage device(s) 750 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

Input device(s) 760 may include any suitable input device(s), such as a keyboard, a mouse, and/or any other suitable cursor control device.

Communications interface(s) 780 may provide an interface for upstream device 400 to communicate over one or more networks and/or with any other suitable device. Communications interface(s) 780 may include any suitable hardware and/or firmware. Communications interface(s) 780 for one embodiment may include, for example, a network adapter, a wireless network adapter, a telephone modem, and/or a wireless modem. For wireless communications, communications interface(s) 780 for one embodiment may use one or more antennas 782.

I/O device(s) 790 may include any suitable I/O device(s) such as, for example, an audio device to help convert sound into corresponding digital signals and/or to help convert digital signals into corresponding sound, a camera, a camcorder, a printer, and/or a scanner.

Downstream device 402 for one embodiment may be any suitable device that may be coupled to system control logic 720 such as, for example and without limitation, a suitable non-volatile memory or storage device 750, an input device 760, a communications interface 780, or any other suitable I/O device 790. Examples of downstream device 402 may include, without limitation, a keyboard, a cursor control device, a storage drive, a storage device, a hub device, a network router or switch, a battery charging device, a printer, a scanner, a camcorder, a camera, a media player, a cellular telephone, a smart phone, a mobile internet device, and a computer system such as a desktop, notebook, netbook, or other computer system.

Although described as residing in system control logic 720, one or more controllers of system control logic 720, including controller 430, for one embodiment may reside with processor 710, allowing processor 710 to communicate with one or more devices or components directly. One or more controllers of system control logic 720, including controller 430, for one embodiment may be integrated on a single die with at least a portion of processor 710. One or more controllers of system control logic 720, including controller 430, for one embodiment may be packaged with processor 710.

In the foregoing description, example embodiments have been described. Various modifications and changes may be made to such embodiments without departing from the scope of the appended claims. The description and drawings are, accordingly, to be regarded in an illustrative rather than a restrictive sense.

What is claimed is:

1. An upstream device comprising:
    a controller comprising
       a communication circuitry to communicate over one or more data lines with a downstream device external to the upstream device, wherein the communication circuitry includes a transmitter circuitry to transmit signals over the one or more data lines to the downstream device; and
    a detection circuitry coupled to the communication circuitry, the detection circuitry to generate a first signal, based on a data signal on at least one of the one or more data lines, with a reduced voltage level compared to a voltage level of the data signal, and to detect the first signal with the reduced voltage level having a value in excess of a reference value and to generate a second signal indicating a result of the detection, wherein the detection circuitry is to generate a third signal indicating an overvoltage condition on one of the data lines, via an OR operation of a logical-OR gate of outputs of two comparators and to output the third signal through a General Purpose Input/Output (GPIO) of the upstream device; and
    a power supply circuitry coupled to the detection circuitry to receive the third signal, the power supply circuitry to deactivate a supply of power over one or more power lines to the downstream device in response to receiving the third signal, wherein the one or more power lines are separate from the one or more data lines.

2. The upstream device of claim 1, wherein the upstream device is to be coupled to the downstream device by a single cable that houses the one or more power lines and the one or more data lines.

3. The upstream device of claim 1, wherein the controller is compatible with a Universal Serial Bus (USB) Revision 2.0 specification.

4. The upstream device of claim 1, wherein the power supply circuitry comprises one or more transistors coupled to the detection circuitry to decouple the one or more power lines from a supply node.

5. The upstream device of claim 1, wherein the detection circuitry includes a voltage divider to divide a voltage on a data line to produce the first signal and one of the comparators to compare the first signal to a reference voltage having the reference value.

6. The upstream device of claim 1, wherein the communication circuitry includes a receiver circuitry to receive signals over the one or more data lines from the downstream device.

7. The upstream device of claim 1, wherein the detection circuitry is coupled to the power supply circuitry to deactivate the supply of power over the one or more power lines to the downstream device to remove the detected excess voltage on at least one of the one or more data lines to protect the communication circuitry.

8. The upstream device of claim 1, wherein the power supply circuitry comprises a voltage regulator module coupled between the detection circuitry and the one or more power lines.

9. The upstream device of claim 8, wherein the voltage regulator module is coupled to the detection circuitry—via a p-type transistor.

10. A system comprising:
    a circuit board;
    a power supply circuitry supported by the circuit board to supply power over one or more power lines to a downstream device external to the system and
    a controller supported by the circuit board, the controller comprising
    a communication circuitry and a detection circuitry coupled to the communication circuitry,
    wherein the communication circuitry is to communicate over one or more data lines with the downstream device, wherein the communication circuitry includes a transmitter circuitry to transmit signals over the one or more data lines to the downstream device, wherein the detection circuitry is to generate a first signal, based on a data signal on at least one of the one or more data lines, with a reduced voltage level compared to a voltage level of the data signal, and to detect the first signal with the reduced voltage level having a value in excess of a reference value and to generate a second signal indicating a result of the detection, and wherein the detection circuitry is to generate a third signal indicating an overvoltage condition on one of the data lines, via an OR operation of a logical-OR gate of outputs of two comparators and to output the third signal through a General Purpose Input/Output (GPIO) of the system; and the power supply circuitry to receive the third signal, the power supply circuitry to deactivate a supply of power over one or more power lines to the downstream device in response to receiving the third signal, wherein the one or more power lines are separate from the one or more data line.

11. The system of claim 10, comprising: a connector to couple the downstream device to the circuit board by a single cable that houses the one or more power lines and the one or more data lines.

12. The system of claim 10, wherein the controller is compatible with a Universal Serial Bus (USB) Revision 2.0 specification.

13. The system of claim 10, wherein the power supply circuitry comprises one or more transistors to decouple the one or more power lines from a supply node.

14. The system of claim 10, wherein the detection circuitry includes a voltage divider to divide a voltage on a data line to produce the first signal, and one of the comparators to compare the first signal to a reference voltage having the reference value.

15. The system of claim 10, wherein the system represents an upstream device that is a host device or a hub device downstream from the host device.

16. The system of claim 10, comprising:
a processor; and
an alternating current to direct current (AC-DC) converter, wherein the power supply circuitry is coupled to the AC-DC converter to supply power over the one or more power lines to the downstream device.

17. The system of claim 10, wherein the system comprises a connector supported by the circuit board.

18. The system of claim 10, wherein the circuit board is positioned in an automobile computer system.

* * * * *